United States Patent Office 3,578,679
Patented May 11, 1971

3,578,679
DECENYLSUCCINAMIC ACID AND IMIDE FROST AND FREEZE PREVENTATIVE COMPOUNDS
Paul J. Caruso, Philadelphia, Pa., and Pieter J. C. Kuiper, Riverside, Calif., assignors to Amchem Products, Inc., Ambler, Pa.
Filed Aug. 3, 1967, Ser. No. 658,179
Int. Cl. C07c 101/24; C07d 27/10
U.S. Cl. 260—326.5
4 Claims

ABSTRACT OF THE DISCLOSURE

Decenylsuccinamic acid and imide frost and freeze preventative compounds and method of use involving the compounds N,N-dimethyl-decenylsuccinamic acid; N-di- methylamino - decenylsuccinamic acid; and N - dimethyl- amino-decenylsuccinimide. The application to crops of any of these compounds in sufficient amounts as present in aqueous solution by conventional spray equipment enables such crops to become resistant to the damaging effects of cold temperatures.

Figure 1:
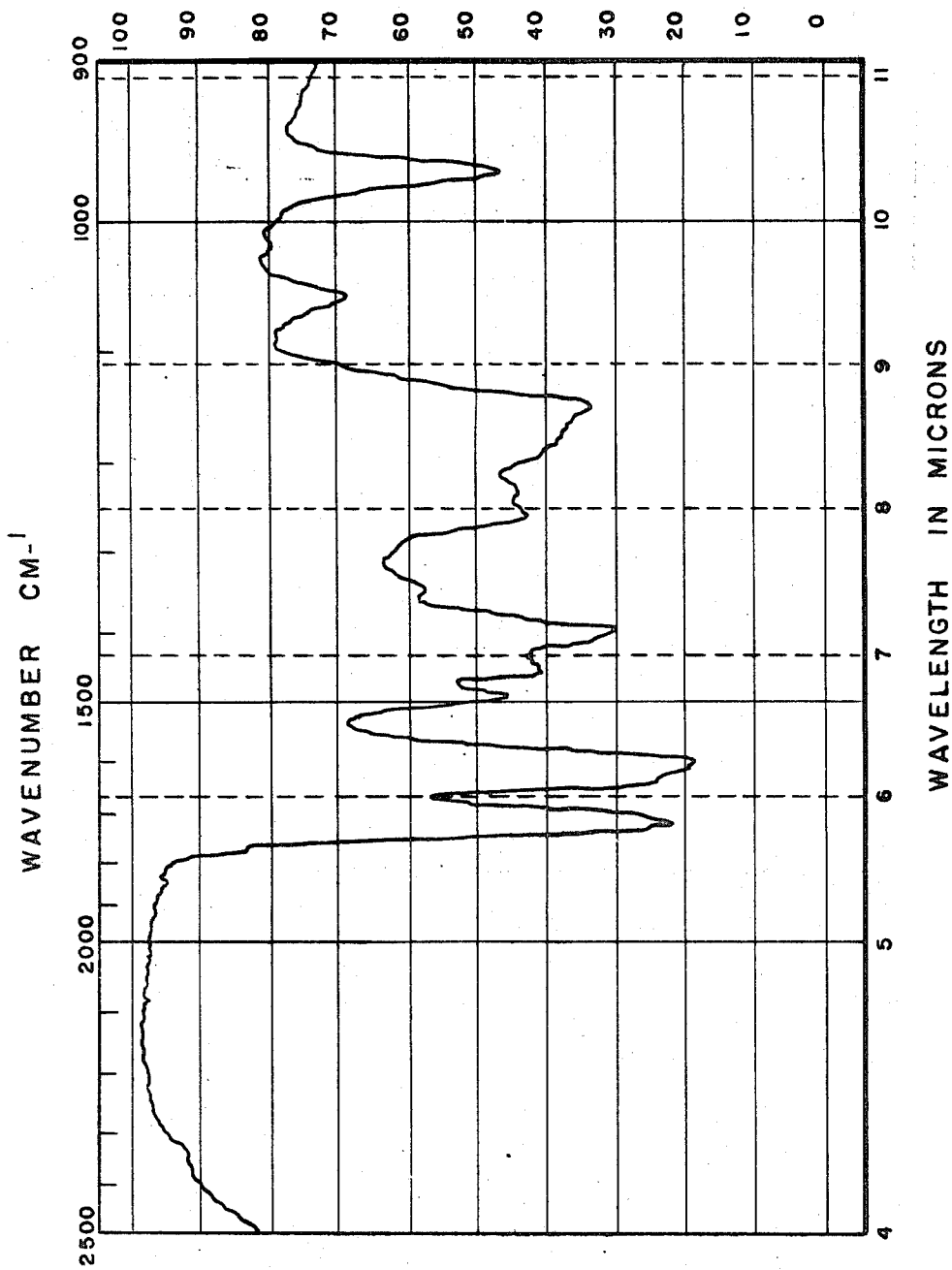

This invention relates to decenylsuccinamic acid and imide frost and freeze preventative compounds and method of use and more particularly to a new invention to promote frost and freeze resistant properties in economic crops.

It is common knowledge that many economic crops can be seriously and permanently stunted or injured by an unexpected frost, particularly where hard freezing takes place. Under present practices, there is little that can be done in the event of a threat of frost except for the physical introduction of sufficient heat or use of heat insulation techniques to ward off the frost. As exemplary of the introduction of heat is the use of a smudge pot, which is generally expensive and many times ineffectual.

It has therefore become an accepted fact that frost and freeze injury to tender growing plants is simply one additional threat to food production which falls in the class of weather, rain, etc. risks which the farmer simply has to take as best he can.

It is therefore not surprising that annually there are tremendous losses in both vegetable and fruit production due to frost. Peach production in an entire area may be eliminated because of late spring freezing since the flower buds and blossoms are quite susceptible to frost. The same damage also occurs on apples and strawberries. Occasionally entire winter vegetable crops in the southern part of the United States are killed because of freezing weather. Beans, tomatoes, and other early weather vegetable crops planted in the coastal areas may be eliminated by low temperatures.

Aside from actual killing of the crops, damage often occurs as a result of partial injury. Frequently, lopsided apples and even russeting occurs in conjunction with late spring frost. In addition to injury to horticultural crops, agronomic crops may also sustain serious injury. Corn in the early stages of ripening may be injured by frost.

It is therefore an object of the present invention to provide a chemical frost and freeze inhibiting method whereby the economic crop becomes more resistant to the damaging effect of cold temperatures.

In particular the present invention involves the use of decenylsuccinamic acid and imide compounds selected from the group consisting of N,N-dimethyl-decenylsuccinamic acid; N-dimethylamino-decenylsuccinamic acid; and N-dimethylamino-decenylsuccinimide. These compounds have been found to be surprisingly effective in enabling certain economic crops to become resistant to the damaging effects of cold temperatures.

It can be said with a reasonable degree of certainty that the compounds of the present invention have the following formulas:

(1) N,N-dimethyl-decenylsuccinamic acid

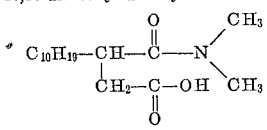

(2) N-dimethylamino-decenylsuccinamic acid

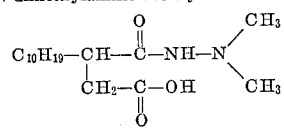

(3) N-dimethylamino-decenylsuccinimide

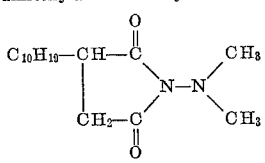

In order to further identify the above three noted compounds, reference is hereby made to the characteristic infrared absorption bands as set forth in the attached three figures of the drawing.

Figure 3:
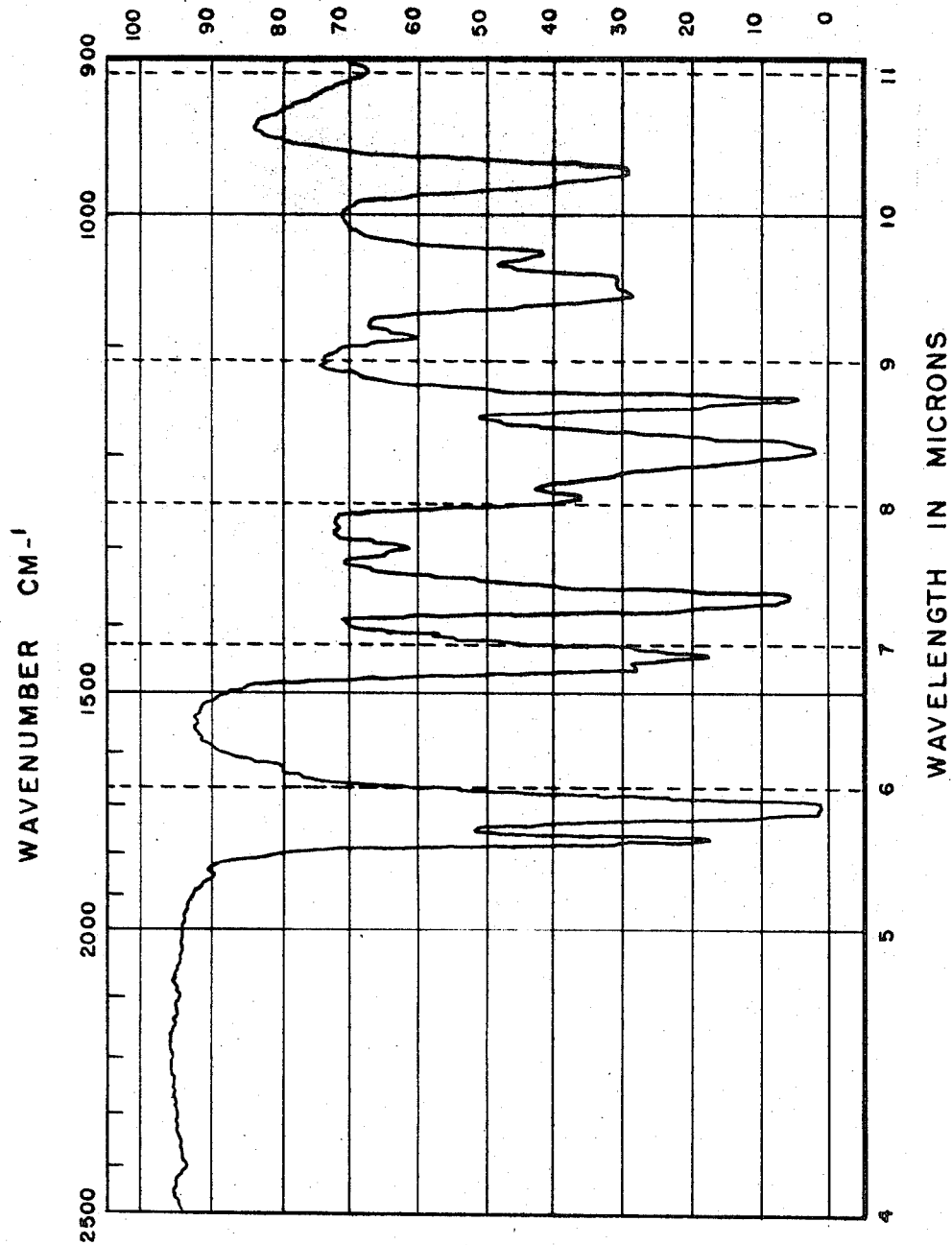

FIG. 1 shows the characteristic infrared absorption band for N,N-dimethyl-decenylsuccinamic acid between 4 and 11 microns;

FI. 2 shows the characteristic infrared absorption band for N-dimethylamino-decenylsuccinamic acid between 3 and 11 microns; and FIG. 3 shows the characteristic infrared absorption band for N-dimethylamino-decenylsuccinimide between 4 and 11 microns.

The aforesaid decenylsuccinamic acid and imide compounds are prepared as follows:

(1) PREPARATION OF N,N-DIMETHYL- DECENYLSUCCINAMIC ACID

To a solution of 536 gm. (2.25 moles) of n-decenyl- succininic anhydride in 900 ml. of acetonitrile there was added 105 gm. (2.28 moles) of anhydrous dimethylamine (gas) with stirring and with external cooling in a water bath at 25° C. The amine was absorbed as rapidly as it was introduced, with concurrent rise in temperature to a maximum of 29° C.

Removal of the acetonitrile under reduced pressure at a temperature not in excess of 50° C. leaves the technical product in essentially quantitative yield. It is a viscous, amber-colored oil, $n_D^{25}$ 1.4770, neutralization equivalent weight 298 (theory required 283).

(2) PREPARATION OF N-DIMETHYLAMINO- DECENYLSUCCINAMIC ACID

To a stirred solution of 397 gm. (1.67 moles) of n-decenylsuccinic anhydride in 500 ml. of methylene chloride there was gradually added a solution of 100 gm. (1.67 moles) of 1,1-dimethylhydrazine in 150 ml. of methylene chloride. The above addition and all subsequent operations wree run at a temperature below 25° C. and, preferably, at 10–20° C. The bulk of the methylene chloride was removed under reduced pressure, and the residual, technical product so obtained was a viscous, amber-colored oil, which gradually congealed to a soft, waxy mass upon standing for several days in a current of air. The yield of this material was essentially quantitative. Titration in aqueous-ethanol to a phenolphthalein endpoint with N/2 sodium hydroxide indicated a neutralization equivalent weight of 330 (theory requires 298.4).

The technical product may be purified as follows: twenty-five grams is suspended in 75 ml. of Skellysolve B with vigorous stirring, and the suspension is refrigerated overnight. The solid is removed by filtration, washed with about 25 ml. of cold Skellysolve B and dried in vacuo. There is thus obtained 8.5 gm. of pearly, colorless, crystalline product, m. 77–81° C.; neutralization equivalent weight 305.

(3) PREPARATION OF N-DIMETHYLAMINO-DECENYLSUCCINIMIDE

N-dimethylamino-decenylsuccinic acid is cyclodehydrated to N-dimethylamino-decenylsuccinimide by heating under reduced pressure until no further water distils out. The reaction may be conducted at 100° C., but is completed in just a few hours by raising the temperature gradually to 165–170° C. under a pressure of 80–90 mm. of mercury. Conversion is substantially complete, the product being a mobile, amber-yellow oil, specific gravity 20°–25° 0.979, $n_D^{25}$ 1.4808. The content of free acid, as determined by titration, is about 4.5%.

While it can be said with a reasonable degree of certainty that the compounds of the present invention are represented by the three formulas set forth hereinabove, reference is hereby made in the present specification and in the appended claims to the following characteristic infrared absorption bands as set forth in the attached three figures of the drawing.

FIG. 1 shows the infrared absorption band for N,N-dimethyl-decenylsuccinamic acid between 4 and 11 microns. With respect to FIG. 1 the following important wave lengths should be kept in mind as characterizing the compound of FIG. 1:

Wave length in microns

| | |
|---|---|
| 5.8 | 7.99 |
| 6.1–6.23 | 8.71 |
| 6.88–6.97 | 9.48 |
| 7.15–7.2 | 10.36 |

Figure 2:
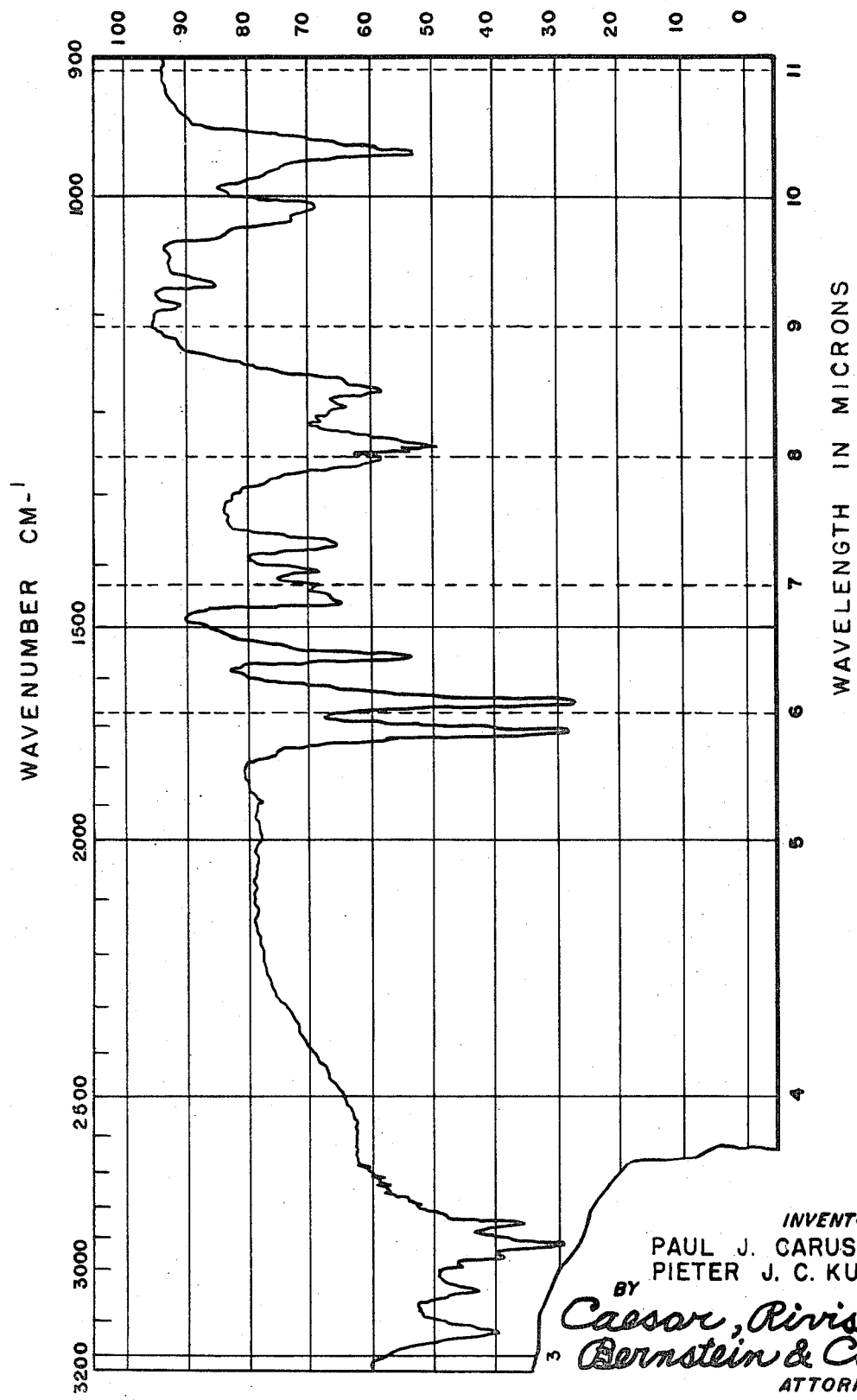

FIG. 2 shows the infrared absorption band for N-dimethylamino-decenylsuccinamic acid between 3 and 11 microns. With respect to FIG. 2 the following important wave lengths should be kept in mind as characterizing the compound of FIG. 2:

Wave length in microns

| | |
|---|---|
| 3.08 | 6.85–6.99 |
| 3.34 | 7.1 |
| 3.41 | 7.3 |
| 3.50 | 8.1 |
| 5.85 | 8.5 |
| 6.08 | 9.32 |
| 6.42 | 9.93 |

FIG. 3 shows the infrared absorption band for N-dimethylamino-decenylsuccinimide between 4 and 11 microns. With respect to FIG. 3 the following important wave lengths should be kept in mind as characterizing the compound of FIG. 3:

Wave length in microns

| | |
|---|---|
| 5.64 | 8.72 |
| 5.85 | 9.46–9.56 |
| 6.85–6.93 | 9.75 |
| 7.31 | 10.31 |
| 7.70 | 11.02 |
| 8.39 | |

Attention is called to the fact that the characteristic infrared absorption bands of FIGS. 1, 2 and 3 were secured by using a Beckman Infrared Spectrophotometer model IR8 using a sodium chloride cell.

The acids of the present invention can be readily converted to corresponding salts by the addition of organic or inorganic alkali such as sodium hydroxide, potassium hydroxide, lithium hydroxide, ethylamine, diethylamine, triethanolamine or other similar alkalis. Likewise the acids can be converted to esters such as ethyl, butyl, butoxyethyl, etc.

As working examples of the utility of the compounds of the present invention the following information is given:

N,N-dimethyl-decenylsuccinamic acid is capable of protecting strawberry flowers against freeze damage. An aqueous solution with 0.001 molar concentration produces useful results. With a duration of a freezing period of 6 hours at −4° C., 40% survival of strawberry flowers was observed with the treated plants while only 8% survived when sprayed with water. Such frost protection under field conditions will provide more than 50% of the normal yield as the loss of a portion of the blossoms will bring about a thinning effect thus increasing the size of the remaining berries.

In addition to this response on strawberries, protection of bean plants against freezing damage was also observed. Freezing temperatures of 3° C. were used and it was observed that with 4 hours freezing period the N-dimethylamino-decenylsuccinamic acid gave 92% survival of bean plants. If the freezing period were extended to 8 hours, 12% of the plants still remained in good condition. In many cases under field conditions, low temperatures are of quite short duration occurring early in the morning and protection of 4 hours in many cases would mean the difference between survival and death of an entire crop.

The N,N-dimethyl-decenylsuccinamic acid protected strawberry flowers against freezing. Spray application of $10_{-3}$ molar concentration gave protection to 30% of the blossoms while a water spray only protected 8%. The duration of the freezing period was 6 hours at −4° C. Similar results were obtained using N-dimethylamino-decenylsuccinamic acid and N-dimethylamino-decenylsuccinamic acid and N-dimethylamino-decenylsuccinimide.

It is therefore seen that in accordance with the methods of the present invention the treated plants exhibit unexpected resistance to unusually cold temperatures. It can be appreciated that the total survival of the bean plants under an exposure of −3° C. for four hours in many cases approximates conditions in the field in the early morning hours with the normal temperature rise after sunrise being sufficient to take the plants above the danger zone. In practicing the methods of the present invention the aqueous solution can be applied by spray equipment well known to those skilled in the art which consists basically of means to deliver the liquid to a fixed or rotating spray head that may be mounted upon a land vehicle or upon a helicopter.

Without further elaboration the foregoing will so fully illustrate my invention that others may, by applying current or future knowledge, adapt the same for use under various conditions of service.

What is claimed as the invention is:

1. Decenylsuccinamic acid and imide frost and freeze preventative compounds selected from the group consisting of N,N-dimethyl-decenylsuccinamic acid; N-dimethylamino-decenylsuccinamic acid; and N-dimethylamino-decenylsuccinimide.
2. N,N-dimethyl-decenylsuccinamic acid.
3. N-dimethylamino-decenylsuccinamic acid.
4. N-dimethylamino-decenylsuccinimide.

References Cited

UNITED STATES PATENTS

| | | | |
|---|---|---|---|
| 2,271,122 | 1/1942 | Harman | 260—784 |
| 2,643,257 | 6/1953 | Miller et al. | |
| 3,240,799 | 3/1966 | Hageman | 260—482 |

LORRAINE A. WEINBERGER, Primary Examiner

P. J. KILLOS, Assistant Examiner

U.S. Cl. X.R.

47—2; 71—95, 113; 260—501.11, 534